US009690108B2

(12) United States Patent
Dewa et al.

(10) Patent No.: US 9,690,108 B2
(45) Date of Patent: Jun. 27, 2017

(54) MEMS BASED SURVEILLANCE SYSTEM AND A METHOD FOR USING SAME

(75) Inventors: Paul G Dewa, Newark, NY (US); Richard L Wiggins, Keene, NY (US)

(73) Assignee: Corning Incorporated, Corning, NY (US)

( * ) Notice: Subject to any disclaimer, the term of this patent is extended or adjusted under 35 U.S.C. 154(b) by 1374 days.

(21) Appl. No.: 13/221,115

(22) Filed: Aug. 30, 2011

(65) Prior Publication Data

US 2012/0050533 A1 Mar. 1, 2012

Related U.S. Application Data

(60) Provisional application No. 61/378,669, filed on Aug. 31, 2010.

(51) Int. Cl.
H04N 7/18 (2006.01)
G02B 27/14 (2006.01)
G02B 26/08 (2006.01)
G02B 27/10 (2006.01)

(52) U.S. Cl.
CPC ....... G02B 27/145 (2013.01); G02B 26/0833 (2013.01); G02B 27/1013 (2013.01)

(58) Field of Classification Search
CPC .................................................. G02B 26/0833
USPC ................... 348/143, 340, 296; 369/112.02; 359/341.32
See application file for complete search history.

(56) References Cited

U.S. PATENT DOCUMENTS

| 6,496,260 | B1 * | 12/2002 | Hafeman et al. ............. 356/433 |
| 7,339,741 | B1 | 3/2008 | Wang et al. |
| 8,107,344 | B2 * | 1/2012 | Handschy et al. ........ 369/112.02 |
| 2004/0021770 | A1 * | 2/2004 | Krill ............................. 348/117 |
| 2005/0185179 | A1 | 8/2005 | Wang et al. |
| 2005/0207022 | A1 | 9/2005 | Cho et al. |
| 2006/0060758 | A1 | 3/2006 | David et al. |
| 2009/0201575 | A1 * | 8/2009 | Fermann et al. ........ 359/341.32 |
| 2009/0323172 | A1 * | 12/2009 | Furuya et al. ................ 359/326 |
| 2010/0171866 | A1 * | 7/2010 | Brady et al. .................. 348/340 |

FOREIGN PATENT DOCUMENTS

WO 2008076444 A1 6/2008

OTHER PUBLICATIONS

Jacqui Hayes; "Single-Pixel Camera Creates Hi-Res Images"; Cosmos Magazine; www.cosmosmagazine.com.
Duarte et al; "Single-Pixel Imaging Via Compressive Sampling"; IEEE Signal Processing Magazine, vol. 25, No. 2, pp. 83-91, Mar. 2008.
PCT/US2011/049635 Search Report.

* cited by examiner

*Primary Examiner* — Dave Czekaj
*Assistant Examiner* — Berteau Joisil
(74) *Attorney, Agent, or Firm* — Kevin L. Bray

(57) ABSTRACT

A micro-electro-mechanical (MEMS) based surveillance system and a method for using the MEMS based surveillance system are described herein for imaging an object. In one example, the MEMS based surveillance system can record images of an object from four different wavelength regions including visible light, near-infrared light, infrared light, and far infrared light.

27 Claims, 2 Drawing Sheets ately available. However, an electronic camera that can record images from all the wavelength regions of visible light, near-IR light, IR light, and far IR light is currently not available. Thus, the currently available surveillance systems which record images in both the visible light and IR light wavelengths need to utilize two or more cameras. Of course, it is not desirable that the currently available surveillance systems need to use multiple cameras to record images in both the visible light and IR light wavelength. Accordingly, there is a need for a new surveillance system that overcomes this shortcoming and other shortcomings associated with the currently available surveillance system. This need and other needs are satisfied by the present invention.

US 9,690,108 B2

MEMS BASED SURVEILLANCE SYSTEM AND A METHOD FOR USING SAME

CROSS-REFERENCE TO RELATED APPLICATIONS

This application claims the benefit of priority under 35 U.S.C. §119 of U.S. Provisional Application Ser. No. 61/378,669 filed on Aug. 31, 2010 the content of which is relied upon and incorporated herein by reference in its entirety.

TECHNICAL FIELD

The present invention relates in general to surveillance systems and, in particular, to a micro-electro-mechanical (MEMS) based surveillance system and a method for using the MEMS based surveillance system.

BACKGROUND

Electronic cameras for recording images from visible light are currently available. Likewise, electronic cameras for recording images from near-infrared (IR) light, IR light, or far IR light are currently available. However, an electronic camera that can record images from all the wavelength regions of visible light, near-IR light, IR light, and far IR light is currently not available. Thus, the currently available surveillance systems which record images in both the visible light and IR light wavelengths need to utilize two or more cameras. Of course, it is not desirable that the currently available surveillance systems need to use multiple cameras to record images in both the visible light and IR light wavelength. Accordingly, there is a need for a new surveillance system that overcomes this shortcoming and other shortcomings associated with the currently available surveillance system. This need and other needs are satisfied by the present invention.

SUMMARY

A MEMS based surveillance system, and a method for using the MEMS based surveillance system have been described in the independent claims of the present application. Advantageous embodiments of the MEMS based surveillance system, and the method for using the MEMS based surveillance system have been described in the dependent claims.

In one aspect, the present invention provides a MEMS based surveillance system for imaging an object. In one embodiment, the MEMS based surveillance system comprises: (a) an imaging optic that receives light associated with the object; (b) a micro-mirror array that receives the light associated with the object from the imaging optic; (c) one or more wavelength selective beamsplitters which receive at least a portion of the light associated with the object from the micro-mirror array; and (d) a plurality of photo-detectors including a first photo-detector and a second photo-detector each of which receive the at least a portion of the light associated with the object that was reflected from or passed through the one or more wavelength selective beamsplitters, wherein the first photo-detector is sensitive for the at least a portion of the light associated with the object that is within a first wavelength band, and wherein the second photo-detector is sensitive for the at least a portion of the light associated with the object that is within a second wavelength band.

In another aspect, the present invention provides a method for using a MEMS based surveillance system to image an object. In one embodiment, the method comprises the steps of: (a) directing the MEMS based surveillance system towards the object, wherein the MEMS based surveillance system includes: (i) an imaging optic that receives light associated with the object; (ii) a micro-mirror array that receives the light associated with the object from the imaging optic; (iii) one or more wavelength selective beamsplitters which receive at least a portion of the light associated with the object from the micro-mirror array; and (iv) a plurality of photo-detectors including a first photo-detector and a second photo-detector each of which receive the at least a portion of the light associated with the object that was reflected from or passed through the one or more wavelength selective beamsplitters, wherein the first photo-detector is sensitive for the at least a portion of the light associated with the object that is within a first wavelength band, and wherein the second photo-detector is sensitive for the at least a portion of the light associated with the object that is within a second wavelength band; and (b) obtaining one or more images of the object using one or more of the plurality of photo-detectors.

In yet another aspect, the present invention provides a MEMS based surveillance system for imaging an object. In one embodiment, the MEMS based surveillance system comprises: (a) an imaging optic that receives light associated with the object; (b) a micro-mirror array that receives the light associated with the object from the imaging optic; (c) a first wavelength selective beamsplitter which receives at least a portion of the light associated with the object from the micro-mirror array; (d) a first photo-detector which receives the at least a portion of the light associated with the object that was reflected from the first wavelength selective beamsplitter, wherein the first photo-detector is sensitive to the at least a portion of the light associated with the object that is within a first wavelength band; (e) a second wavelength selective beamsplitter which receives the at least a portion of the light associated with the object which passed through the first wavelength selective beamsplitter; (f) a second photo-detector which receives the at least a portion of the light associated with the object that was reflected from the second wavelength selective beamsplitter, wherein the second photo-detector is sensitive to the at least a portion of the light associated with the object that is within a second wavelength band; (g) a third wavelength selective beamsplitter which receives the at least a portion of the light associated with the object which passed through the second wavelength selective beamsplitter; (h) a third photo-detector which receives the at least a portion of the light associated with the object that was reflected from the third wavelength selective beamsplitter, wherein the third photo-detector is sensitive to the at least a portion of the light associated with the object that is within a third wavelength band; and (i) a fourth photo-detector which receives the at least a portion of the light associated with the object that passed through the third wavelength selective beamsplitter, wherein the fourth photo-detector is sensitive to the at least a portion of the light associated with the object that is within a fourth wavelength band.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be had by reference to the following detailed description when taken in conjunction with the accompanying drawings wherein.

DETAILED DESCRIPTION

Figure 1:
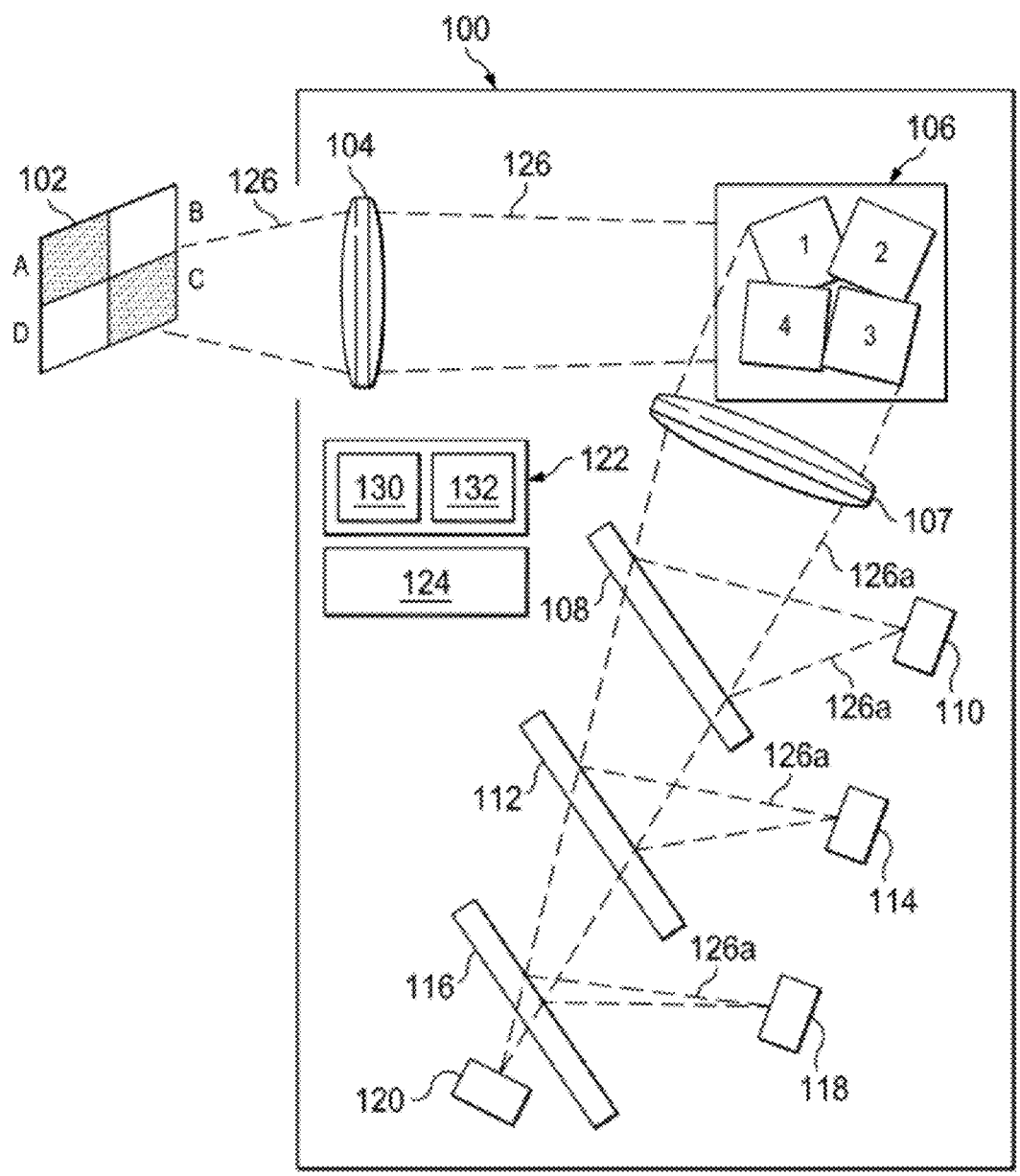
FIG. 1 is a block diagram illustrating the basic components of an exemplary MEMS based surveillance system in accordance with an embodiment of the present invention.

Referring to FIG. 1, there is a block diagram illustrating the basic components of an exemplary MEMS based surveillance system 100 configured to image an object 102 in accordance with an embodiment of the present invention. The exemplary MEMS based surveillance system 100 includes an imaging optic 104, a micro-mirror array 106, a condensing lens 107, a first wavelength selective beamsplitter 108, a first photo-detector 110, a second wavelength selective beamsplitter 112, a second photo-detector 114, a third wavelength selective beamsplitter 116, a third photo-detector 118, a fourth photo-detector 120, a controller 122, and an absorbing dump 124. The MEMS based surveillance system 100 incorporates many other components all of which are well known to those skilled in the art but for clarity only the components 104, 106, 107, 108, 110, 112, 114, 116, 118, 120, 122 and 124 which are needed to describe the invention are illustrated and discussed herein.

The exemplary MEMS based surveillance system 100 includes the imaging optic 104 (e.g., convex lens 104) which functions to receive light 126 associated with the object 102. The micro-mirror array 106 (e.g., Texas Instrument's DLP® array of mirrors 106) functions to receive the light 126 associated with the object 102 from the imaging optic 104. The micro-mirror array 106 would be located at the focal plane of the imaging optic 104. The condensing lens 107 (e.g., convex lens 107) functions to collect at least a portion of the light 126a which is reflected from the micro-mirror array 106. The first wavelength selective beamsplitter 108 (e.g., first dichroic beamsplitter mirror 108) functions to receive at least a portion of the light 126a associated with the object 102 which is reflected from the micro-mirror array 106 and passed through the condensing lens 107 (note: the condensing lens 107 is optional). The first photo-detector 110 functions to receive the light 126a associated with the object 102 that was reflected from the first wavelength selective beamsplitter 108. The first photo-detector 110 is sensitive to light 126a within a first wavelength band. In this example, the light 126a reflected from the micro-mirror array 106 has wavelengths from 0.4 μm-12.0 μm. The first wavelength selective beamsplitter 108 reflects light 126a in the 7 μm-12 μm wavelength band and transmits light 126a in the 0.4 μm-7.0 μm wavelength band while the first photo-detector 110 is sensitive to the light 126a in the 7 μm-12 μm far infrared wavelength band.

The second wavelength selective beamsplitter 112 (e.g., second dichroic beamsplitter mirror 112) functions to receive the light 126a associated with the object 102 which passed through the first wavelength selective beamsplitter 108. The second photo-detector 114 functions to receive the light 126a associated with the object 102 that was reflected from the second wavelength selective beamsplitter 112. The second photo-detector 114 is sensitive to the light 126a within a second wavelength band. In this example, the second wavelength selective beamsplitter 112 reflects light 126a in the 3.0 μm-5.0 μm wavelength band and transmits light 126a in the 0.4 μm-5.5 μm wavelength band while the second photo-detector 114 is sensitive to the light 126a in the 3.0 μm-5.0 μm infrared wavelength band.

The third wavelength selective beamsplitter 116 (e.g., third dichroic beamsplitter mirror 116) functions to receive the light 126a associated with the object 102 which passed through the second wavelength selective beamsplitter 112. The third photo-detector 118 functions to receive the light 126a associated with the object 102 that was reflected from the third wavelength selective beamsplitter 116. The third photo-detector 118 is sensitive to light 126a within a third wavelength band. In this example, the third wavelength selective beamsplitter 116 reflects light 126a in the 1.0 μm-2.5 μm wavelength band and transmits light 126a in the 0.4 μm-1.0 μm wavelength band while the third photo-detector 118 is sensitive to the light 126a in the 1.0 μm-2.5 μm near-infrared wavelength band. The fourth photo-detector 120 functions to receive the light 126a associated with the object 102 that passed through the third wavelength selective beamsplitter 116. The fourth photo-detector 120 is sensitive to the light 126a within a fourth wavelength band. In this example, the fourth photo-detector 120 is sensitive to light 126a in the 0.4 μm-1.0 μm visible wavelength band.

The controller 122 includes a processor 130 and a non-transitory computer-readable storage medium 132 which has an executable program stored thereon, where the executable program instructs the processor 130 to control a position of each mirror 1, 2, 3, 4 (only four shown) in the micro-mirror array 102 such that each mirror 1, 2, 3, 4 either directs a portion of the light 126 associated with the object 102 towards the first wavelength selective beamsplitter 108 or away from the first wavelength selective beamsplitter 108 towards the absorbing light dump 124. The absorbing light dump 124 functions to reduce the return signal from the surveillance system 100, thus decreasing the possible detection of the surveillance system 100 from those under surveillance. In an alternative embodiment, the controller 122 can control the position of each mirror 1, 2, 3, 4 to be in any one of three states: (1) parallel to the plane of the imaging optic 104 (power off); (2) tilted at 12 degrees relative to the plane of the imaging optic 104 toward the first wavelength selective beamsplitter 108 (pixel on); and (3) tilted at 12 degrees relative to the plane of the imaging optic 104 toward the absorbing light dump 124 (pixel off). In this example, the controller 122 is shown incorporated within the MEMS based surveillance system 100 but if desired could be located remote but still connected via wire connection or wireless connection to the MEMS based surveillance system 100.

In one case, the controller 122 can control the position of each mirror 1, 2, 3, 4 to be in the on-state one at a time, across rows and then columns, so that the image will be read out as a function of time at the photo-detectors 110, 114, 118 and 120. In another case, since the controller 133 can individually address the mirrors 1, 2, 3, 4 of the micro-mirror array 106, the full area of the object 102 need not be read out at full resolution at all times. For example, sub-arrays of N×N mirrors could be read out to reduce the data bandwidth required to view the entire object 102. This is beneficial to transmitting data over long distances so the object 102 can be viewed remotely. If more spatial resolution is desired, then the image detail can be 'zoomed up' where the sub-array N can be reduced toward 1. In yet another case, if only a sub-section of the object 102 is of interest, then the full array or mirrors 1, 2, 3, 4 need not be addressed, saving data transmission bandwidth. Further, any sub-section or combinations of sub-sections of the object 102 can be imaged and not just around the center of the field. A couple examples of how the controller 122 can control the individual positions of the mirrors 1, 2, 3, 4 in the micro-mirror array 106 to obtain an image of a sub-section of the object 102 is provided below with respect to FIGS. 2-3.

Figure 2:
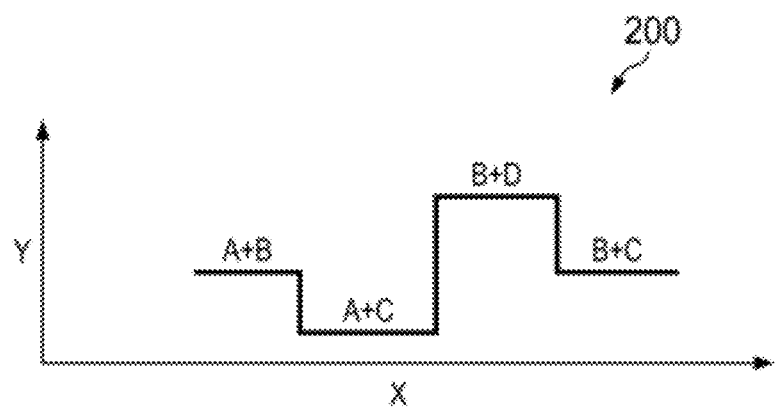
FIG. 2 is a signal diagram used to help explain an exemplary way how the MEMS based surveillance system can be controlled to image a sub-section of an object in accordance with an embodiment of the present invention.

Referring to FIG. 2, there is a signal diagram 200 used to help explain an exemplary way how the MEMS based surveillance system 100 can be controlled to image sub-section A of the object 102 in accordance with an embodiment of the present invention. In this example, the object 102 has sub-sections A, B, C, D all of which are imaged onto the micro-mirror array 106 and the signal diagram 200 has an y-axis representing signal out and the x-axis representing time. First, the controller 122 selects mirrors 1 and 2 to be on such that the photo-detectors 110, 114, 118 and 120 each image sections A and B of object 102. Next, the controller 122 selects mirrors 1 and 3 to be on such that the photo-detectors 110, 114, 118 and 120 each image sections A and C of object 102. Then, the controller 122 selects mirrors 2 and 4 to be on such that the photo-detectors 110, 114, 118 and 120 each image sections B and D of object 102. Thereafter, the controller 122 selects mirrors 2 and 3 to be on such that the photo-detectors 110, 114, 118 and 120 each image sections B and C of object 102. Finally, four different images of sub-section A of the object 102 can be extracted as (A+B)+(A+C)−(B+C).

Figure 3:
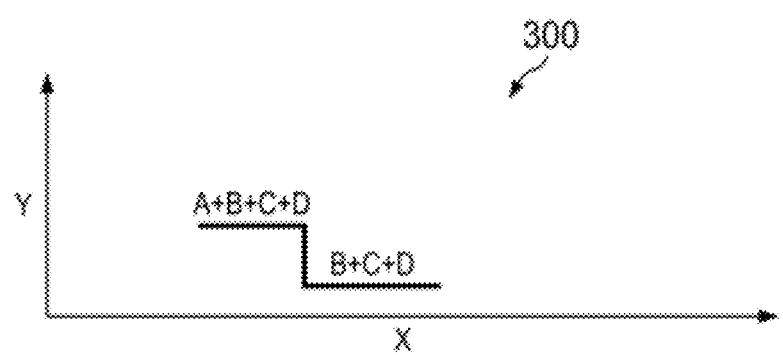
FIG. 3 is a signal diagram used to help explain another exemplary way how the MEMS based surveillance system can be controlled to image a sub-section of an object in accordance with an embodiment of the present invention.

Referring to FIG. 3, there is a signal diagram 300 used to help explain another exemplary way how the MEMS based surveillance system 100 can be controlled to image sub-section A of the object 102 in accordance with an embodiment of the present invention. In this example, the object 102 has sub-sections A, B, C, D all of which are imaged onto the micro-mirror array 106 and the signal diagram 300 has an y-axis representing signal out and the x-axis representing time. First, the controller 122 selects mirrors 1, 2, 3 and 4 to be on such that the photo-detectors 110, 114, 118 and 120 each image sections A, B, C, and D of the object 102. Next, the controller 122 selects mirrors 2, 3, 4 to be on such that the photo-detectors 110, 114, 118 and 120 each image sections B, C, and D of the object 102. Finally, four different images of sub-section A of the object 102 can be extracted as (A+B+C+D)−(B+C+D). Of course, there are many possible ways the controller 122 can individually address the mirrors 1, 2, 3, 4 in the micro-mirror array 106 to image one or more of the sub-sections A, B, C, D of the object 102.

From the foregoing, one skilled in the art will appreciate that the MEMS based surveillance system 100 is a marked improvement over the currently available surveillance systems which need to utilize two or more cameras to record an image in both the visible light and IR light wavelengths. Although the MEMS based surveillance system 100 described herein incorporates four photo-detectors 110, 114, 118 and 120 which are used obtain four different images of the object 102 in the visible light, near-IR light, IR light, and far IR light wavelength bands it should be understood that the MEMS based surveillance system 100 could incorporate any number of wavelength selective beamsplitters and photo-detectors to obtain two or more images of the object 102 in two or more different wavelength bands. For example, the MEMS based surveillance system 100 could include: (a) the imaging optic 104 that receives light 126 associated with the object 102; (b) the micro-mirror array 106 that receives the light 126 associated with the object 102 from the imaging optic 104; (c) the condensing lens 107 (optional); (d) the first wavelength selective beamsplitter 108 which receives at least a portion of the light 126a associated with the object 102 from the micro-mirror array 106 that passed through the condensing lens 107; and (e) the first and second photo-detectors 110 and 114, wherein the first photo-detector 110 receives the light 126a associated with the object 102 that was reflected the first wavelength selective beamsplitter 108 and the second photo-detector 114 receives the light 126a associated with the object 102 that passed through the first wavelength selective beamsplitter 108. Accordingly, the MEMS based surveillance system 100 should not be construed in a limited manner.

In addition, the present invention provides for a method for using the MEMS based surveillance system 100 to image an object 102. In one embodiment, the method comprises the steps of: (a) directing the MEMS based surveillance system 100 towards the object 102, wherein the MEMS based surveillance system 100 includes: (i) an imaging optic 104 that receives light 126 associated with the object 102; (ii) a micro-mirror array 106 that receives the light 126 associated with the object 102 from the imaging optic 104; (iii) one or more wavelength selective beamsplitters 108, 112 and 116 which receive at least a portion of the light 126a associated with the object 102 from the micro-mirror array 106; and (iv) a plurality of photo-detectors 110, 114, 118 and 120 each of which receive the at least a portion of the light 126a associated with the object 102 that was reflected from or passed through the one or more wavelength selective beamsplitters 108, 112, and 116; and (b) obtaining one or more images of the object 102 using one or more of the photo-detectors 110 and 114 (for example). If desired, the method can include a step of using a controller 122 to control a position of each mirror 1,2, 3, 4 in the micro-mirror array 106 such that each mirror 1, 2, 3, 4 either directs a portion of the light 126a associated with the object 102 towards the wavelength selective beamsplitters 108, 112 and 116 and the photo-detectors 110, 114, 118 and 120 or away from the wavelength selective beamsplitters 108, 112 and 116 and the photo-detectors 110, 114, 118 and 120.

Furthermore, the MEMS based surveillance system 100 and method for using the MEMS based surveillance system 100 of the present invention provides several technical and commercial advantages (e.g. cost savings, quality improvements, benefits, improved performance/attributes) over the prior technology. A listing of some of the exemplary advantages is provided next:

Surveillance with higher spatial resolution than state-of-the-art infrared focal plane array (FPA) cameras.

Surveillance at infrared wavelengths with much lower cost than state-of-the-art infrared FPA cameras.

Surveillance from 0.35 um to 20 um wavelength band with a single camera.

Surveillance with exact overlap of images at different wavelength bands.

Surveillance that achieves high sensitivity by using 100% of the light in a wavelength range.

Surveillance that can use multiple detectors 110, 114, 118 and 120 with high quantum efficiencies to provide high sensitivity.

Surveillance that uses small detectors 110, 114, 118 and 12 with minimal cooling requirements and low background noise.

Surveillance with in-line spectral separation for Hyperspectral imaging.

Ability to group sub-arrays of mirrors to reduce data transmission bandwidth.

Ability to 'zoom in' on sub-section(s) of the object 102 without mechanical zoom mechanisms.

Ability to 'zoom in' on sub-section(s) of the object 102 while maintaining low data transmission bandwidth.

Ability to 'zoom in' on off axis sub-section(s) of the object 102 without gimbaled panning mechanisms.

Ability to redirect light from off pixels toward a light absorbing dump 124 and reduce detectability.

Ability to use reconstruct the image using only addition and subtraction in the manner of a Hadamard transform.

Ability to perform motion detection, edge enhancement, and other image enhancements using only addition and subtraction of the data.

In one alternative implementation, half of the pixels would be directing light to one set of detectors A, while half of the pixels would be directing light to a second set of detectors B. The set of pixels could be varied over time in the manner of a 2-dimensional Hadamard transform for the purpose of image reconstruction. In this manner all of the light from the image is collected all of the time. The signals from the two detectors sets are coherent, so the difference signal is two times larger than that from one set. The detector noise from the two detector sets is incoherent. The noise contributed by the second set of detectors increases the total noise by $\sqrt{2}$.

Although one embodiment of the present invention has been illustrated in the accompanying Drawings and described in the foregoing Detailed Description, it should be understood that the invention is not limited to the disclosed embodiment, but is capable of numerous rearrangements, modifications and substitutions without departing from the invention as set forth and defined by the following claims. It should also be noted that the reference to the "present invention" or "invention" used herein relates to exemplary embodiments and not necessarily to every embodiment that is encompassed by the appended claims.

The invention claimed is:

1. A micro-electro-mechanical (MEMS) based surveillance system for imaging an object, the MEMS based surveillance system comprising:
   an imaging optic positioned to receive light associated with the object;
   a micro-mirror array positioned to receive the light associated with the object from the imaging optic;
   one or more wavelength selective beamsplitters positioned to receive at least a portion of the light associated with the object from the micro-mirror array; and
   a plurality of photo-detectors comprising a first photo-detector and a second photo-detector each of which is positioned to receive the at least a portion of the light associated with the object that was reflected from or passed through the one or more wavelength selective beamsplitters, wherein the first photo-detector is sensitive for the at least a portion of the light associated with the object that is within a first wavelength band, and wherein the second photo-detector is sensitive for the at least a portion of the light associated with the object that is within a second wavelength band.

2. The MEMS based surveillance system of claim 1, further comprising a condensing lens positioned between the micro-mirror array and the one or more wavelength selective beamsplitters.

3. The MEMS based surveillance system of claim 1, further comprising a controller that is configured to control a position of each mirror in the micro-mirror array such that each mirror either directs a portion of the light associated with the object towards the one or more wavelength selective beamsplitters and the plurality of photo-detectors or away from the one or more wavelength selective beamsplitter and the plurality of photo-detectors.

4. The MEMS based surveillance system of claim 2, further comprising an absorbing light dump positioned to receive the portion of the light associated with the object that was directed away from the one or more wavelength selective beamsplitter and the plurality of photo-detectors.

5. The MEMS based surveillance system of claim 1, wherein the plurality of photo-detectors further comprises a third photo-detector which is sensitive for the at least a portion of the light associated with the object that is within a third wavelength band, and a fourth photo-detector which is sensitive for the at least a portion of the light associated with the object that is within a fourth wavelength band.

6. The MEMS based surveillance system of claim 5, wherein the first photo-detector is sensitive to light that is in a far-infrared light wavelength band, the second photo-detector is sensitive to light that is in a infrared light wavelength band, the third photo-detector is sensitive to light that is in an near-infrared light wavelength band, and the fourth photo-detector is sensitive to light that is in a visible light wavelength band.

7. A method for using a micro-electro-mechanical (MEMS) based surveillance system to image an object, the method comprising the steps of:
   directing the MEMS based surveillance system towards the object, wherein the MEMS based surveillance system comprises:
      an imaging optic positioned to receive light associated with the object;
      a micro-mirror array positioned to receive the light associated with the object from the imaging optic;
      one or more wavelength selective beamsplitters positioned to receive at least a portion of the light associated with the object from the micro-mirror array; and
      a plurality of photo-detectors comprising a first photo-detector and a second photo-detector each of which is positioned to receive the at least a portion of the light associated with the object that was reflected from or passed through the one or more wavelength selective beamsplitters, wherein the first photo-detector is sensitive for the at least a portion of the light associated with the object that is within a first wavelength band, and wherein the second photo-detector is sensitive for the at least a portion of the light associated with the object that is within a second wavelength band; and
   obtaining one or more images of the object using one or more of the plurality of photo-detectors.

8. The method of claim 7, wherein the MEMS based surveillance system further comprises a condensing lens positioned between the micro-mirror array and the one or more wavelength selective beamsplitters.

9. The method of claim 7, further comprising the step of controlling a position of each mirror in the micro-mirror array such that each mirror either directs a portion of the light associated with the object towards the one or more wavelength selective beamsplitters and the plurality of photo-detectors or away from the one or more wavelength selective beamsplitter and the plurality of photo-detectors.

10. The method of claim 9, wherein the MEMS based surveillance system further comprising an absorbing light dump positioned to receive the portion of the light associated with the object that was directed away from the one or more wavelength selective beamsplitter and the plurality of photo-detectors.

11. The method of claim 7, wherein the plurality of photo-detectors further comprises a third photo-detector which is sensitive for the at least a portion of the light associated with the object that is within a third wavelength band, and a fourth photo-detector is sensitive for the at least a portion of the light associated with the object that is within a fourth wavelength band.

12. The method of claim 11, wherein the first photo-detector is sensitive to light that is in a far-infrared light wavelength band, the second photo-detector is sensitive to light that is in a infrared light wavelength band, the third photo-detector is sensitive to light that is in an near-infrared light wavelength band, and the fourth photo-detector is sensitive to light that is in a visible light wavelength band.

13. A micro-electro-mechanical (MEMS) based surveillance system for imaging an object, the MEMS based surveillance system comprising:
an imaging optic positioned to receive light associated with the object;
a micro-mirror array positioned to receive the light associated with the object from the imaging optic;
a first wavelength selective beamsplitter positioned to receive at least a portion of the light associated with the object from the micro-mirror array;
a first photo-detector positioned to receive the at least a portion of the light associated with the object that was reflected from the first wavelength selective beamsplitter, wherein the first photo-detector is sensitive to the at least a portion of the light associated with the object that is within a first wavelength band;
a second wavelength selective beamsplitter positioned to receive the at least a portion of the light associated with the object which passed through the first wavelength selective beamsplitter;
a second photo-detector positioned to receive the at least a portion of the light associated with the object that was reflected from the second wavelength selective beamsplitter, wherein the second photo-detector is sensitive to the at least a portion of the light associated with the object that is within a second wavelength band;
a third wavelength selective beamsplitter positioned to receive the at least a portion of the light associated with the object which passed through the second wavelength selective beamsplitter;
a third photo-detector positioned to receive the at least a portion of the light associated with the object that was reflected from the third wavelength selective beamsplitter, wherein the third photo-detector is sensitive to the at least a portion of the light associated with the object that is within a third wavelength band; and
a fourth photo-detector positioned to receive the at least a portion of the light associated with the object that passed through the third wavelength selective beamsplitter, wherein the fourth photo-detector is sensitive to the at least a portion of the light associated with the object that is within a fourth wavelength band.

14. The MEMS based surveillance system of claim 13, further comprising a condensing lens positioned between the micro-mirror array and the first wavelength selective beamsplitter.

15. The MEMS based surveillance system of claim 13, further comprising a controller that is configured to control a position of each mirror in the micro-mirror array such that each mirror either directs a portion of the light associated with the object towards the first wavelength selective beamsplitter or away from the first wavelength selective beamsplitter.

16. The MEMS based surveillance system of claim 13, further comprising an absorbing light dump positioned to receive the portion of the light associated with the object that was directed away from the first wavelength selective beamsplitter.

17. The MEMS based surveillance system of claim 13, wherein the first photo-detector is sensitive to light that is in a far-infrared light wavelength band, the second photo-detector is sensitive to light that is in a infrared light wavelength band, the third photo-detector is sensitive to light that is in an near-infrared light wavelength band, and the fourth photo-detector is sensitive to light that is in a visible light wavelength band.

18. The MEMS based surveillance system of claim 1, further comprising:
a controller that is configured to control a position of each mirror in the micro-mirror array such that each mirror is either in an on-state and directs a portion of the light associated with the object towards the one or more wavelength selective beamsplitters and the plurality of photo-detectors or is in an off-state and directs a portion of the light associated with the object away from the one or more wavelength selective beamsplitters and the plurality of photo-detectors; and
the controller is further configured to select individual mirrors or sub-arrays or sub-sections of mirrors to be in the on-state to sequentially read out an image of the object as a function of time at the plurality of photo-detectors.

19. The MEMS based surveillance system of claim 1, further comprising:
a controller that is configured to control a position of each mirror in the micro-mirror array such that each mirror is either in an on-state and directs a portion of the light associated with the object towards the one or more wavelength selective beamsplitters and the plurality of photo-detectors or is in an off-state and directs a portion of the light associated with the object away from the one or more wavelength selective beamsplitters and the plurality of photo-detectors; and
the controller is further configured to select individual mirrors or sub-arrays or sub-sections of mirrors to be in the on-state such that at least one of:
a full area of an image of the object need not be read out at full resolution at all times at the plurality of photo-detectors;
an image of a sub-section of the object is read out at the plurality of photo-detectors; and
an image of a sub-section or combinations of sub-sections of the object and not a center of a field of the object is read out at the plurality of photo-detectors.

20. The method of claim 7, further comprising a step of:
controlling a position of each mirror in the micro-mirror array such that each mirror is either in an on-state and directs a portion of the light associated with the object towards the one or more wavelength selective beamsplitters and the plurality of photo-detectors or is in an off-state and directs a portion of the light associated with the object away from the one or more wavelength selective beamsplitters and the plurality of photo-detectors; and the controlling step further comprises a step of selecting individual mirrors or sub-arrays or sub-sections of mirrors to be in the on-state to sequentially read out an image of the object as a function of time at the plurality of photo-detectors.

21. The method of claim 7, further comprising a step of:

controlling a position of each mirror in the micro-mirror array such that each mirror is either in an on-state and directs a portion of the light associated with the object towards the one or more wavelength selective beamsplitters and the plurality of photo-detectors or is in an off-state and directs a portion of the light associated with the object away from the one or more wavelength selective beamsplitters and the plurality of photo-detectors; and the controlling step further comprises a step of selecting individual mirrors or sub-arrays or sub-sections of mirrors to be in the on-state such that at least one of:

a full area of an image of the object need not be read out at full resolution at all times at the plurality of photo-detectors;

an image of a sub-section of the object is read out at the plurality of photo-detectors; and an image of a sub-section or combinations of sub-sections of the object and not a center of a field of the object is read out at the plurality of photo-detectors.

22. The MEMS based surveillance system of claim 13, further comprising:

a controller that is configured to control a position of each mirror in the micro-mirror array such that each mirror is either in an on-state and directs a portion of the light associated with the object towards the first wavelength selective beamsplitter or is in an off-state and directs a portion of the light associated with the object away from the first wavelength selective beamsplitter; and the controller is further configured to select individual mirrors or sub-arrays or sub-sections of mirrors to be in the on-state to sequentially read out an image of the object as a function of time at each of the first, second, third and fourth photo-detectors.

23. The MEMS based surveillance system of claim 13, further comprising:

a controller that is configured to control a position of each mirror in the micro-mirror array such that each mirror is either in an on-state and directs a portion of the light associated with the object towards the first wavelength selective beamsplitter or is in an off-state and directs a portion of the light associated with the object away from the first wavelength selective beamsplitter; and the controller is further configured to select individual mirrors or sub-arrays or sub-sections of mirrors to be in the on-state such that at least one of:

a full area of an image of the object need not be read out at full resolution at all times at the plurality of photo-detectors;

an image of a sub-section of the object is read out at the plurality of photo-detectors; and an image of a sub-section or combinations of sub-sections of the object and not a center of a field of the object is read out at the plurality of photo-detectors.

24. A micro-electro-mechanical (MEMS) based surveillance system for imaging an object, the MEMS based surveillance system comprising:

an imaging optic positioned to directly receive light associated with the object;

a micro-mirror array positioned to directly receive the light associated with the object from the imaging optic;

a first wavelength selective beamsplitter positioned to directly receive at least a portion of the light associated with the object from the micro-mirror array;

a first photo-detector positioned to directly receive the at least a portion of the light associated with the object that was reflected from the first wavelength selective beamsplitter, wherein the first photo-detector is sensitive to the at least a portion of the light associated with the object that is within a first wavelength band;

a second wavelength selective beamsplitter positioned to directly receive the at least a portion of the light associated with the object which passed through the first wavelength selective beamsplitter;

a second photo-detector positioned to directly receive the at least a portion of the light associated with the object that was reflected from the second wavelength selective beamsplitter, wherein the second photo-detector is sensitive to the at least a portion of the light associated with the object that is within a second wavelength band.

25. The MEMS based surveillance system of claim 24, further comprising:

a third wavelength selective beamsplitter positioned to directly receive the at least a portion of the light associated with the object which passed through the second wavelength selective beamsplitter;

a third photo-detector positioned to directly receive the at least a portion of the light associated with the object that was reflected from the third wavelength selective beamsplitter, wherein the third photo-detector is sensitive to the at least a portion of the light associated with the object that is within a third wavelength band; and a fourth photo-detector positioned to directly receive the at least a portion of the light associated with the object that passed through the third wavelength selective beamsplitter, wherein the fourth photo-detector is sensitive to the at least a portion of the light associated with the object that is within a fourth wavelength band.

26. The MEMS based surveillance system of claim 24, further comprising a condensing lens positioned directly between the micro-mirror array and the first wavelength selective beamsplitter.

27. The MEMS based surveillance system of claim 24, further comprising a controller that is configured to control a position of each mirror in the micro-mirror array such that each mirror either directs a portion of the light associated with the object towards the first wavelength selective beamsplitter or away from the first wavelength selective beamsplitter.

* * * * *